US008661082B2

(12) United States Patent
Bhakar et al.

(10) Patent No.: US 8,661,082 B2
(45) Date of Patent: Feb. 25, 2014

(54) EXTRACTING PREVIOUS MESSAGES FROM A LATER MESSAGE

(75) Inventors: Gautam Bhakar, Redmond, WA (US); Jorge Pereira, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 885 days.

(21) Appl. No.: 12/142,824

(22) Filed: Jun. 20, 2008

(65) Prior Publication Data

US 2009/0319617 A1 Dec. 24, 2009

(51) Int. Cl.
*G06F 15/16* (2006.01)

(52) U.S. Cl.
USPC .......................................... 709/206

(58) Field of Classification Search
None
See application file for complete search history.

(56) References Cited

U.S. PATENT DOCUMENTS

| | | | | |
|---|---|---|---|---|
| 5,841,982 A * | 11/1998 | Brouwer et al. | ............... | 709/224 |
| 5,905,863 A | 5/1999 | Knowles et al. | | |
| 6,055,413 A * | 4/2000 | Morse et al. | .................. | 340/7.43 |
| 6,167,402 A | 12/2000 | Yeager | | |
| 6,330,589 B1 * | 12/2001 | Kennedy | ........................ | 709/206 |
| 6,442,592 B1 | 8/2002 | Alumbaugh et al. | | |
| 6,631,398 B1 * | 10/2003 | Klein | ............................ | 709/206 |
| 6,772,397 B1 * | 8/2004 | Bates et al. | .................... | 715/205 |
| 6,895,257 B2 * | 5/2005 | Boman et al. | ............... | 455/556.1 |
| 7,174,366 B2 | 2/2007 | Chou | | |
| 7,222,299 B1 * | 5/2007 | Lim et al. | ....................... | 715/273 |
| 7,243,125 B2 * | 7/2007 | Newman et al. | ............... | 709/206 |
| 7,296,058 B2 | 11/2007 | Throop | | |
| 7,487,223 B2 * | 2/2009 | Kiyohara | ....................... | 709/217 |
| 7,587,458 B2 * | 9/2009 | Wong | .............................. | 709/206 |
| 7,593,995 B1 * | 9/2009 | He et al. | .......................... | 709/206 |
| 7,653,696 B2 * | 1/2010 | Brown et al. | .................. | 709/206 |
| 7,831,676 B1 * | 11/2010 | Nagar | ............................ | 709/206 |
| 2001/0049745 A1 * | 12/2001 | Schoeffler | ....................... | 709/238 |
| 2002/0013854 A1 * | 1/2002 | Eggleston et al. | ............. | 709/205 |
| 2003/0045308 A1 * | 3/2003 | Sidhu et al. | .................... | 455/466 |
| 2003/0110227 A1 * | 6/2003 | O'Hagan | ......................... | 709/206 |
| 2003/0228862 A1 * | 12/2003 | Nagashima | ................ | 455/412.1 |
| 2004/0064473 A1 | 4/2004 | Thomas et al. | | |
| 2004/0073616 A1 * | 4/2004 | Fellenstein et al. | ........... | 709/206 |
| 2004/0111617 A1 * | 6/2004 | Patrick | ............................ | 713/176 |
| 2005/0021969 A1 * | 1/2005 | Williams et al. | ............... | 713/176 |
| 2005/0138127 A1 * | 6/2005 | Jain | .................................. | 709/206 |
| 2006/0036696 A1 * | 2/2006 | Maresh | .......................... | 709/206 |
| 2006/0085503 A1 * | 4/2006 | Stoye et al. | ..................... | 709/206 |
| 2006/0177012 A1 * | 8/2006 | Forney et al. | ................. | 379/67.1 |

(Continued)

OTHER PUBLICATIONS

Abu-Hakima, "An Agent-Based System for Email Highlighting", Proceedings of the fifth international conference on Autonomous agents, 2001, pp. 224-225.

(Continued)

*Primary Examiner* — Ian N Moore
*Assistant Examiner* — Dung B Huynh
(74) *Attorney, Agent, or Firm* — Louise Bowman; Brian Haslam; Micky Minhas (57) ABSTRACT

A message extraction system is described that extracts a previous message from a current message in a conversation thread. The message extraction system receives a current message and identifies a previous message candidate within the current message. The system determines a checksum of the previous message candidate and compares the determined checksum to a previously stored checksum of the previous message. If the two checksums match, the system extracts the previous message from the reply message rather than from the server.

18 Claims, 5 Drawing Sheets

(56) References Cited

U.S. PATENT DOCUMENTS

| | | | |
|---|---|---|---|
| 2006/0190493 A1* | 8/2006 | Kawai et al. | 707/104.1 |
| 2006/0190830 A1* | 8/2006 | Gerstl et al. | 715/757 |
| 2006/0248151 A1 | 11/2006 | Belakovskiy et al. | |
| 2007/0038714 A1* | 2/2007 | Sell | 709/206 |
| 2007/0106729 A1* | 5/2007 | Adams et al. | 709/206 |
| 2007/0113101 A1* | 5/2007 | LeVasseur et al. | 713/189 |
| 2007/0124396 A1* | 5/2007 | Febonio et al. | 709/206 |
| 2007/0136354 A1 | 6/2007 | Chen | |
| 2007/0143420 A1* | 6/2007 | Daniell | 709/206 |
| 2007/0192416 A1* | 8/2007 | Gupta | 709/206 |
| 2008/0082648 A1* | 4/2008 | Ahmed et al. | 709/223 |
| 2008/0086532 A1* | 4/2008 | Cunningham | 709/206 |
| 2008/0109462 A1* | 5/2008 | Adams et al. | 707/101 |
| 2008/0189373 A1* | 8/2008 | Ikonen et al. | 709/206 |
| 2008/0294738 A1* | 11/2008 | Pastorelli et al. | 709/206 |
| 2008/0307062 A1* | 12/2008 | Wang | 709/206 |
| 2008/0313291 A1* | 12/2008 | Kazmi | 709/206 |
| 2009/0049139 A1* | 2/2009 | Fouotsop et al. | 709/206 |
| 2009/0063642 A1* | 3/2009 | Lord | 709/206 |
| 2009/0234924 A1* | 9/2009 | Edelen et al. | 709/206 |
| 2010/0121931 A1* | 5/2010 | Brown et al. | 709/206 |
| 2012/0278419 A1* | 11/2012 | Tysowski et al. | 709/206 |

OTHER PUBLICATIONS

"Extract Message for Outlook 2.01", Apr. 18, 2008, http://extract-message.qarchive.org/.

"Parsing Email Messages", (Retrieved Apr. 18, 2008) http://www.lassosoft.com/Documentation/TotW/index.lasso?9271.

* cited by examiner

EXTRACTING PREVIOUS MESSAGES FROM A LATER MESSAGE

BACKGROUND

Collaboration servers provide interaction between users, typically within an organization. For example, an electronic mail server, such as Microsoft Exchange, provides electronic mail delivery, shared calendaring, and other services to users within a corporation or other enterprise. Using a collaboration server, users can send email back and forth, schedule meetings, store contact lists, and so forth.

Email and other forms of communication, such as public folder and message forum posts, often involve conversations. In a conversation, one or more participants create messages on a particular topic. Each message after the original message that starts the conversation is a reply to either the original or a later message in the conversation. For example, a participant Alicia may send a message or post to a forum regarding a topic such as politics. A participant Bob may then reply to Alicia's message. Another participant Carl may then reply to either Alicia or Bob's message, and Alicia and Bob may make additional replies based on replies to their respective messages. The result is a large tree of messages that make up a conversation on the particular topic.

When a new participant enters a conversation, he/she often wants to go back and read what contributions previous participants have made to the conversation. For example, the new participant may want to avoid adding redundant information that other participants have already contributed. Conversations can be very large, and the new participant may open not only the latest message, but also all of the previous messages in the conversation. It is not unusual for a conversation to contain 50 or more messages.

One of the most frequent problems for email and collaboration servers is scalability. Email and collaboration servers often provide services to thousands of users, many of whom may simultaneously log on and attempt to access the services. The high level of concurrent use can exceed the server's available resources. The amount of information that can be held in memory often determines the number of users to which a server can scale, because accesses to secondary storage devices (e.g., hard drives) often incur delays that are substantially greater than memory (e.g., 100×). Thus, when application developers build email and collaboration servers, it is often a design goal to reduce the frequency of accesses of secondary storage devices.

Conversations compound the problem. When a conversation participant accesses a message in a conversation and begins reading through the conversation, the participant may request many messages in the conversation stored by the server. For example, a user may view the 50 previous messages in a particular conversation. Multiply this by the thousands of users that may be accessing the server simultaneously and the requests may quickly exceed the amount of messages that the server can keep in memory or the number of input/output (I/O) requests that the server can handle. Thus, the server will inevitably end up accessing slower, secondary storage devices, which in turn reduces the number of users to which the email and collaboration server can provide services. The users of the server may also notice a degraded level of service based on the exhaustion of resources at the server.

SUMMARY

A message extraction system is described that extracts a previous message from a current message in a conversation thread. The message extraction system receives a current message for which a conversation participant wants to open a previous message. The system identifies a previous message candidate within the current message. The system determines a checksum of the previous message candidate. The system compares the determined checksum to a previously stored checksum of the previous message. If the two checksums match, the system provides an indication that the previous message candidate matches the known previous message and extracts the previous message from the reply message rather than from the server. Thus, the message extraction system avoids accessing the disk or other secondary storage at the server to retrieve the previous message text.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A message extraction system is described that extracts a previous message from a current message in a conversation thread. Because each reply message in a thread typically contains the text of the previous message, it is not necessary to access the previous message from the server if the content of the message can be verified as not having changed. The message extraction system receives a current message for which a conversation participant wants to open a previous message. For example, a user may open the second message in a conversation and request that the system display the fir$^{st}$ message in the conversation. The system identifies a previous message candidate within the current message. For example, the system may search for indented text or an "Re" line (i.e., Latin "in the matter of") that often prefaces a message to which a reply is directed. The system determines a checksum of the previous message candidate. For example, the system may calculate a CRC32 checksum of the text of the previous message candidate. The system compares the determined checksum to a previously stored checksum of the previous message. For example, the system may store a checksum of each message in a conversation (e.g., by inspecting the body of a message and adding the checksum when the message is sent). If the two checksums match, the system provides an indication that the previous message candidate matches the known previous message and extracts the previous message from the reply message rather than from the server. Thus, the message extraction system avoids accessing the disk or other secondary storage at the server to retrieve the previous message text.

In some embodiments, the message extraction system stores the checksum for each message of a conversation in a message integrity tag associated with each message. The system receives a request to send a message. For example, a conversation participant may compose a new message and send it to one or more recipients. The system creates a message integrity tag based on the contents of the message. For example, the message integrity tag may include a checksum of the text of the message body. The system stores the message integrity tag as a property of the message. For example, if the message is stored in a database of messages, then the system may store the message integrity tag as a column in a message table. Finally, the system sends the new message to the recipients.

These and other aspects of the message extraction system are described in further detail below.

Figure 1:
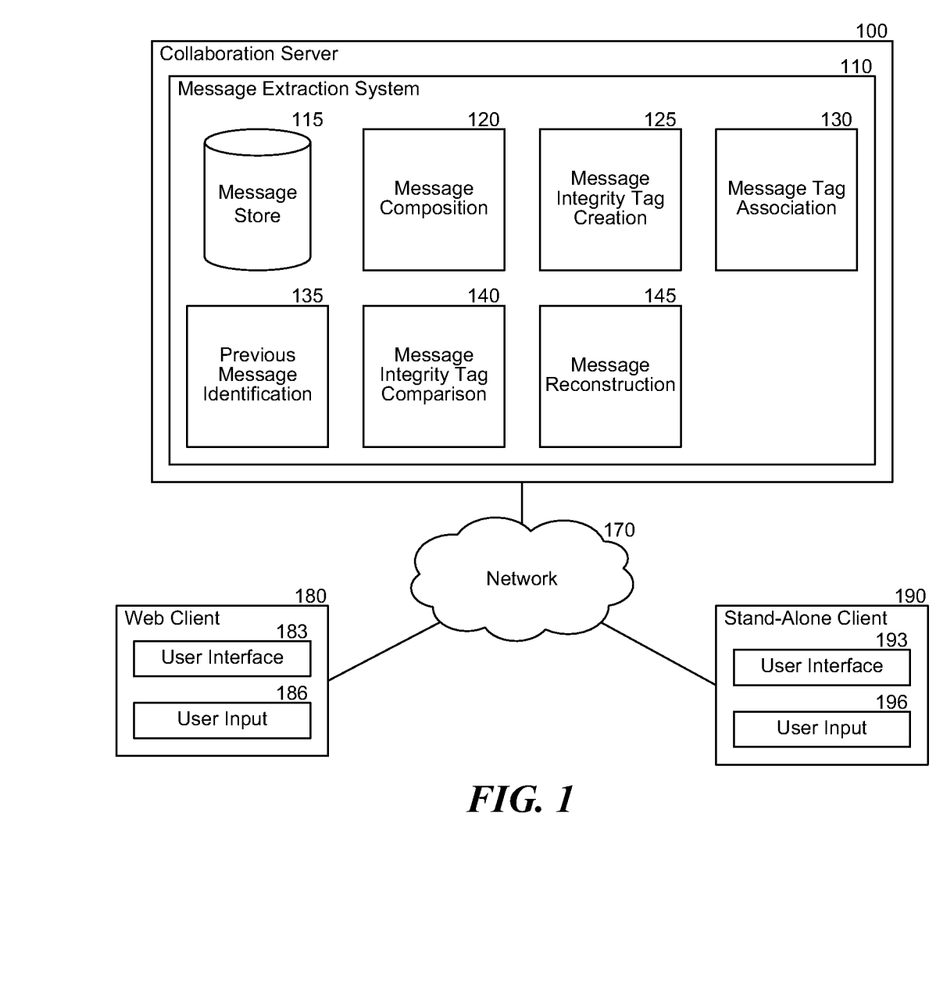
FIG. 1 is a block diagram that illustrates the components of a message extraction system, in one embodiment.

FIG. 1 is a block diagram that illustrates the components of the message extraction system, in one embodiment. The message extraction system 110 may be part of a collaboration server 100, as shown, or may be a separate component that interacts with the collaboration server 100. The message extraction system 110 comprises a message store 115, message composition component 120, message integrity tag creation component 125, message tag association component 130, previous message identification component 135, message integrity tag comparison component 140, and a message reconstruction component 145. The components of the message extraction system 110 are described in further detail below. The message extraction system 110 is connected via a network 170 to one or more clients, such as web client 180 and stand-alone client 190. Each client 180 and 190 contains a user interface 183 and 193 that displays messages and other information to the user and a user input component 186 and 196 that receives input from the user, such as requests to open messages in a conversation. For example, the web client can be Microsoft Outlook Web Access through which, using a browser, a conversation participant can access messages in a conversation. The stand-alone client includes traditional applications, such as Microsoft Outlook, that operate from a conversation participant's desktop and connect to a collaboration server 100.

The message store 115 stores messages for a particular group of users. For example, the message store 115 may store messages for all users at a particular corporation, internet service provider (ISP), or geographic site, or may be one of several stores that cooperatively store messages for one of these types of entities. The message store 115 holds the content of a message and all of the properties associated with the message. For example, the message store 115 may hold the message body, any attachments, and properties, such as the message sender, date the message was sent, conversation identifier of a conversation to which the message belongs, and so forth.

The message composition component 120 creates new messages based on users' requests. For example, the message composition component 120 may receive a request from a user to create a new message that has specified text in the body. When the user has completed the message, the user indicates to the system that the message is ready for sending. For example, the user may select a "send" button from the user interface of the user's client application. When the message is ready for sending, the message extraction system adds a message integrity tag to the message using the components described below.

The message integrity tag creation component 125 creates a message integrity tag based on the content of a new message. The message integrity tag may include a checksum of the body of the new message. For example, the message integrity tag may include a CRC32 checksum of the message body text. The message integrity tag may also include a checksum of the formatting of the message and other information, such as the count of words in the message. The contents of the message integrity tag are described in further detail herein.

The message tag association component 130 associates the message integrity tag with newly composed messages stored in the message store 115. For example, the message tag association component may store the tag as a property associated with the message in the message store 115. Even after messages are sent, they remain in the message store 115, particularly when the recipient of the message is a user of the same collaboration server. In this case, sending a message is does not actually transport the message anywhere, but rather associates the message with the inboxes of the message recipients. When the recipients or later recipients (such as those to which the message is forwarded) attempt to read the message, the server will retrieve the message from the message store 115, and the associated message integrity tag will also be available. The system 110 may determine the message integrity tag at various levels within the collaboration server 100, such as at submission to the server 100 or within the transport of the server 100 as the server 100 is sending or delivering the message.

The previous message identification component 135 scans a current message for the bodies of previous messages. A message in a conversation typically contains the body of the message to which it replies. Each message in a conversation except the original message will be a reply to a previous message. It is common to indent the text of the previous message or include a header within the message body to designate to a recipient reading the message where the new message body ends and the previous message body begins. The previous message identification component 135 programmatically determines where the previous message body begins programmatically, such as by searching for the header or indented text. The identified previous message body is called a previous message candidate until the system 110 verifies that the body has not been modified. There may be multiple previous message candidates within a particular message, representing the chain of replies that occur throughout the conversation. If there are ambiguities about where the previous message begins, the previous message identification component 135 may try several candidates in an attempt to find a match with the previous message.

The message integrity tag creation component 125 described above is also used to create a message integrity tag for each previous message candidate. The message integrity tag comparison component 140 retrieves the message integrity tag associated with each message in a conversation and compares this known tag with the tag created for each previous message candidate. If a match is found, then the system 110 determines that the previous message candidate contains the same body as the matching previous message in the message store 115. Note, however, that the match can be determined without ever retrieving the actual message body of the previous message from the message store 115. Because the tag associated with the previous message is potentially much smaller than the body of the previous message, the message extraction system 110 greatly reduces the memory and I/O requirements of the message store 115 (and by extension the collaboration server 100).

The message reconstruction component 145 reconstructs the previous message using the identified matching message body from the previous message. Reconstruction includes copying the text from the current message into a new message made to look like the previous message. Because the body of the message matches, a conversation participant cannot tell the difference between the reconstructed message and a previous message retrieved from the message store 115. However, because the reconstructed message is retrieved from the already available current message rather than the message store 115, the burden on the collaboration server 100 is reduced.

The computing device on which the system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
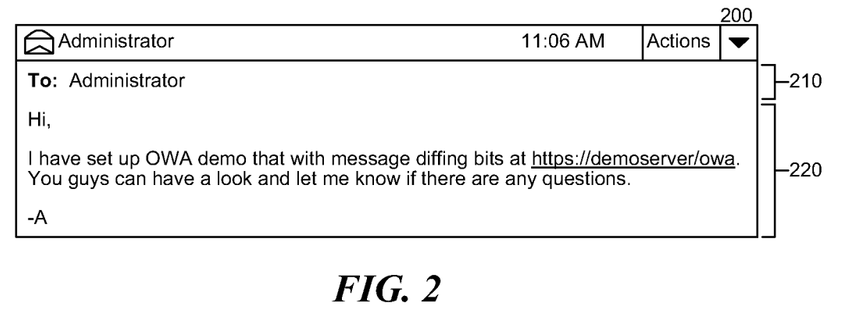
FIG. 2 is a display diagram that illustrates an initial message in a conversation received by the message extraction system, in one embodiment.

FIG. 2 is a display diagram that illustrates an initial message in a conversation received by the message extraction system, in one embodiment. The message 200 contains a message header 210 and a message body 220. The message header 210 displays the recipient of the message and the message body 220 displays the text of the message.

Figure 3:
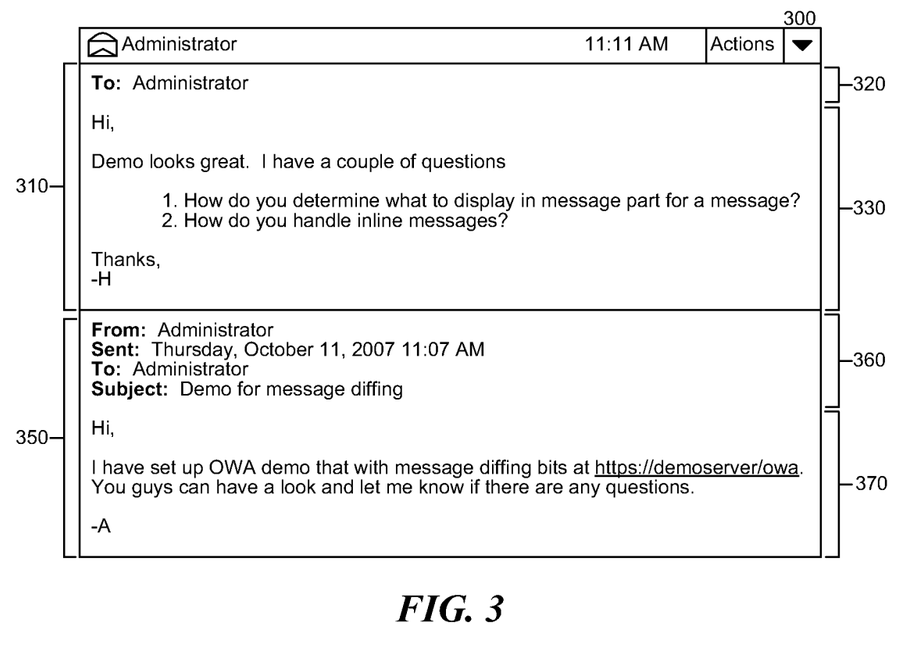
FIG. 3 is a display diagram that illustrates a reply to the message of FIG. 2, in one embodiment.

FIG. 3 is a display diagram that illustrates a reply to the message of FIG. 2, in one embodiment. The message 300 contains a reply portion 310 and a previous message portion 350. The reply portion 310 contains a message header 320 and a message body 330. The message header 320 displays the recipient of the message and the message body 330 displays the message text. The previous message portion 350 contains a reply header 360 and a previous message body 370. The reply header 360 is generated by the conversation participant's email client when the participant replies to a message. The reply header 360 specifies details of the previous message, such as who the message is from, when it was sent, any subject the message specified, and so on. The reply header 360 has a common format that can be used to identify the beginning of the previous message body 370. Using the message integrity tag as described herein, the message extraction system can reconstruct the message illustrated in FIG. 2 using the message displayed in FIG. 3. Thus, if the user requests to open the original message the message extraction system can do so without retrieving the previous message from the message store.

Figure 4:
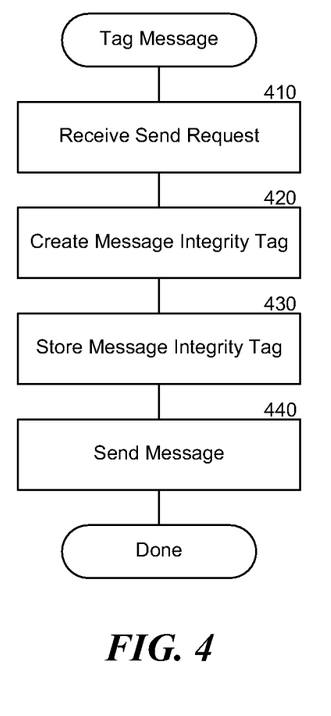
FIG. 4 is a flow diagram that illustrates the processing of the message extraction system to tag a message, in one embodiment.

FIG. 4 is a flow diagram that illustrates the processing of the message extraction system to tag a message, in one embodiment. In block 410, the system receives a request to send a message that includes a message body containing text and one or more identified recipients. For example, a conversation participant may compose a message using an email client and request that an email server send the message. In block 420, the system creates a message integrity tag that comprises a checksum of the message body text. For example, the system may compute a SHA1 hash of the message body text. In block 430, the system stores the message integrity tag as a property of the message. For example, the message integrity tag may be stored in a database table of a message store and associated with the message. The message integrity tag is stored in a way that it can be accessed without retrieving the message body text so that the server can operate more efficiently in cases where the previous message text can be extracted from a later message using the message integrity tag. In block 440, the system sends the message to the identified recipients. The recipients of the message or later messages can access the message store to obtain the message integrity tag associated with the message.

Figure 5:
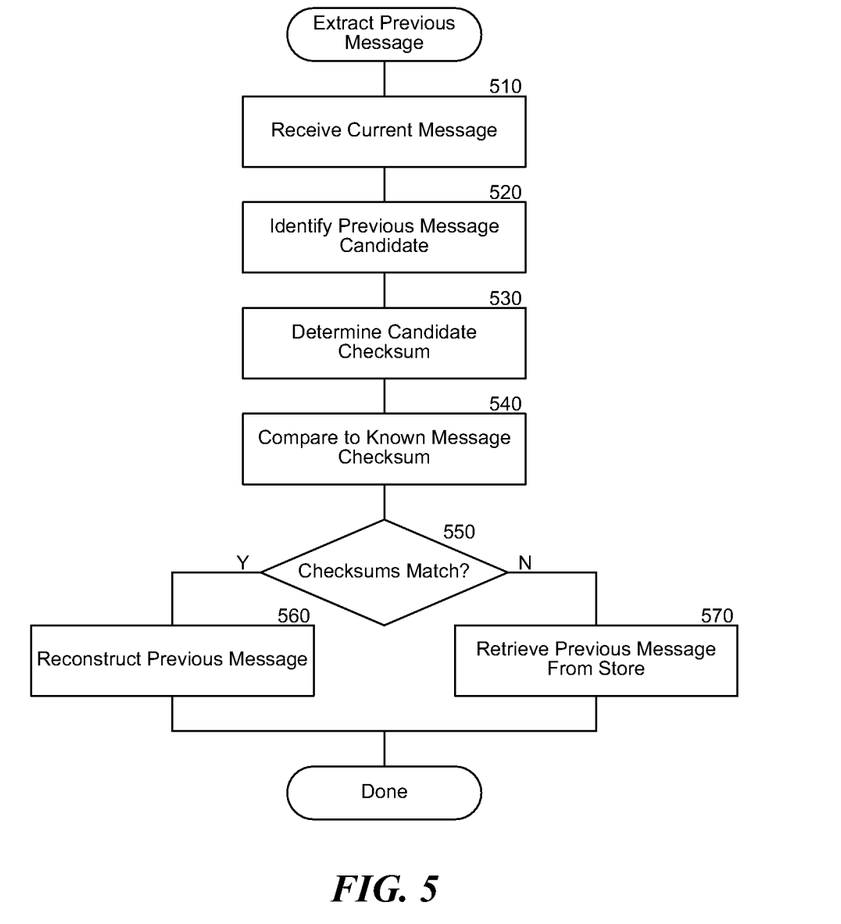
FIG. 5 is a flow diagram that illustrates the processing of the message extraction system to extract a previous message from a latest message, in one embodiment.

FIG. 5 is a flow diagram that illustrates the processing of the message extraction system to extract a previous message from the latest message, in one embodiment. In block 510, the system receives the current message and a request from a conversation participant to open a previous message in the conversation. For example, a conversation participant may select a message in an email client and double click a previous message to open it. In block 520, the system identifies a previous message candidate within the current message that may contain the body of the previous message. For example, the system may search for a reply header and select the text after the reply header as the previous message candidate. In block 530, the system determines a checksum of the previous message candidate. For example, the system may invoke the CRC32 algorithm to determine a checksum of the text of the previous message candidate.

In block 540, the system compares the determined checksum of the previous message candidate with a checksum of the previous message. For example, the system may retrieve a list of previous message checksums associated with the conversation of the current message from the message store. In decision block 550, if the checksums match, the system continues at block 560, else the system continues at block 570. In block 560, the system reconstructs the previous message based on the matching text of the current message. In block 570, the system retrieves the previous message from the message store. In some embodiments, before block 570 if the checksums did not match, the system loops to block 520 to identify another previous message candidate until either no further candidates can be identified or a matching checksum is found.

The message extraction system can determine the checksum of a message in a variety of ways. Those of ordinary skill in the art will recognize that there are many available algorithms for computing a checksum of data, such as message text. For example, the message extraction system can use MD5, SHA1, CRC32, or any other suitable algorithm that provides a summary of data that can be compared to determine if the data has changed.

In some embodiments, the message extraction system removes certain characters from the message text before computing the message text checksum. For example, certain symbolic characters like smilies or emoticons may be modified by certain mail clients in ways that are not significant enough to cause the message extraction system to retrieve the previous message text from the collaboration server. As another example, numbering may be converted to bullets or other characters by some email applications. Thus, the message extraction system may mask out these characters when computing the checksum for storage in the message integrity tag and likewise mask out these characters when computing the checksum for previous message candidates. In this way, minor inconsistencies do not cause extra message retrievals from secondary storage and thus do not prevent the performance gain that is possible using the message extraction system.

In some embodiments, the message extraction system stores information in the message integrity tag in addition to the message text checksum. For example, the system may store a count of words contained in the message to prevent collisions. Collisions occur when two different sets of data produce the same checksum value. Because the checksum value is smaller than the original data, collisions are inevitable in checksum algorithms. However, the likelihood of collisions among data of the same length is much less likely, so storing the count of words is one way of avoiding an incorrect match due to a collision when the count of words is different.

Rather than only comparing the checksum, the message extraction system first compares the count of words of a potentially matching message to the count of words in the tag stored for the known previous message. If the word counts do not match, then the potentially matching message does not match the known previous message. If the count of words match, then the system determines the checksum of the potentially matching message and if the checksum matches that of the known previous message, the system determines that the potentially matching message is the same as the known previous message.

In some embodiments, the message extraction system also uses the word count of the original message to identify previous message candidates. As discussed herein, the system can identify the start of a previous message candidate by looking for a reply header and starting at the end of the reply header. The end of the previous message candidate can then be determined by using the word count to include as many words as are in the word count and stop, rather than going all the way to the end of the message (and potentially including other replies). This can be particularly helpful where a collaboration server or email client inserts a signature or footer at the end of each message after the user has sent the message. By stopping at the count of words that were in the message at the time of composition, the system can avoid improperly including the later-added footer that could cause two otherwise identical messages not to match.

In some embodiments, the message extraction system determines a format checksum in addition to the message text checksum and includes the format checksum in the message integrity tag. The format checksum provides a summary of the formatting in the message that the message extraction system can check against a potentially matching message to determine whether the formatting of the message has changed after delivery. For example, a sender may compose a message in HTML with substantial formatting, but upon receipt, a receiving client may convert the message to plain text and therefore may remove the HTML formatting from the message. By leaving formatting information out of the message text checksum and storing a separate format checksum, the message extraction system can determine whether the text of the message has changed by comparing the message text checksum and whether the formatting has changed by comparing the format checksum.

In some embodiments, the message extraction system determines the formatting checksum based on the formatting of a subset of the message text. It is often the case that the formatting of a message is either all the same as the original or all different. In other words, it is rarely the case that a user replies to a message and modifies one or two characters or words of the previous message. More typically, differences in email clients cause the formatting of the entire message to be modified, such as changing the font of the message. Therefore, the message extraction system may examine, for example, only the formatting of the first character of the message (both original messages and previous message candidates) to save time determining the format checksum. The format checksum is based on a data structure that contains relevant formatting data. For example, the data structure may identify the font of the selected character, whether the character is emboldened, italicized, or underlined, the color of the character, the font size, the margins and padding of the paragraph the character is part of, and so forth.

In some embodiments, the message extraction system uses extracted message text without accessing the server even though the formatting of the message text has changed. For example, the message client may display a preview of a message, such as the first two or three lines, that does not typically contain formatting. The extracted message text is sufficient for display as preview text, and it is not necessary to access the server to retrieve the original message formatting. In other cases, such as when the message is opened and the user wants to see the original message with all of its original formatting, the message extraction system may retrieve the original message from the server to obtain the original formatting.

The message extraction system can associate the message integrity tag with the original message in numerous ways. In some embodiments, the message extraction system is associated with a collaboration server that uses a database for storing messages in a table with multiple fields or columns. The collaboration server stores message text in one field and other properties of the message in separate fields. For example, the collaboration server may store the message sender, send time of the message, recipients, and other information about the message in separate fields. The message extraction system stores the message digest in one such field, so that it can later be accessed with or without accessing the text of the message.

In some embodiments, the message extraction system retrieves message integrity tags for each message in a conversation when the user opens a message in the conversation. For example, when the system retrieves the current message that the user wants to open, the system may also retrieve the message integrity tags of all previous messages in the thread. If the messages are stored in a database table, then the systems requests the full row of information for the current message and only select columns for the previous messages. Because the select columns are smaller than the full message text, they are more likely to be stored in memory by the email server, and thus accessing them may not result in the email server accessing the disk or other secondary storage.

The message extraction system can create the message integrity tag at various times during the life of a message. For example, the message extraction system can create the tag during message send, and as noted above, either at the client or the server. The message extraction system can also create the tag when a user reads the conversation, when the message is received from the transport, right before the message is placed in the recipient's mailbox in the backend, and so forth.

There are many protocols for accessing messages in the manner described above. One example is the Messaging Application Programming Interface (MAPI) used by Microsoft Exchange Server. Using MAPI, a server can define new message properties and a client can request specific properties of a message, including the message integrity tag described.

In some embodiments, the message extraction system provides an API for retrieving each message integrity tag associated with a conversation or subset of a conversation. Conversations can be identified by a conversation identifier that is stored as a message property. For example, Microsoft Exchange Server assigns a globally unique identifier (GUID) to a new conversation and assigns the same GUID to all replies in the conversation. In addition, for each reply in the conversation, Microsoft Exchange adds a 5-byte message identifier to the conversation identifier. The 5-byte message identifier is composed from the date and time at which the reply was sent. Other collaboration servers provide similar identification of conversations and replies. The message extraction system provides an API through which an application can request the message integrity tag described herein for each message in the conversation. For example, the API may use MAPI to allow the application to retrieve the MAPI property that contains the message integrity tag for each message in the conversation.

In some embodiments, the message extraction system comprises components on the client that compute message integrity tags. Although determining such tags at the server has been described above, the client may also participate in the process for additional performance benefits. For example, a client email application (e.g., Microsoft Outlook) may determine the values to be placed in the message integrity tag and send these values to the server along with a new message. In this way, the client saves server resources by taking on some of the computational burden that the server would otherwise perform. Similarly, the client may examine a current message and determine message integrity tags for previous message candidates. The client can then send these tags to the server for comparison with the actual previous message integrity tags or the server can send the actual previous message integrity tags to the client for comparison. By performing these additional functions, the client can save not only server processing time by reducing disk reads, but may also save bandwidth by reducing the amount of data sent to the client when previous messages can be extracted from a current message at the client.

In some embodiments, the message extraction system identifies previous message text even when the text has been modified. For example, conversation participants often reply to messages by typing inline. A conversation participant may address a previous message paragraph by paragraph by entering new text below each paragraph. The new text is often prefaced by certain characters, such as the initials of the replying participant in brackets, and the new text may have different formatting (e.g., italics, color). The message system may attempt to identify and remove such text and determine the checksum of the text with the suspected inline reply text removed. If the checksum matches the known checksum for the previous message, then the previous message can still be extracted from the current message. As another example, when a conversation participant replies to a message, the email client of the conversation participant may preface each line of the previous message with a ">" (greater-than) or other character. The message extraction system may attempt to remove such known characters and try the checksum to determine if a match can be found for the original text of the previous message.

Figure 6:
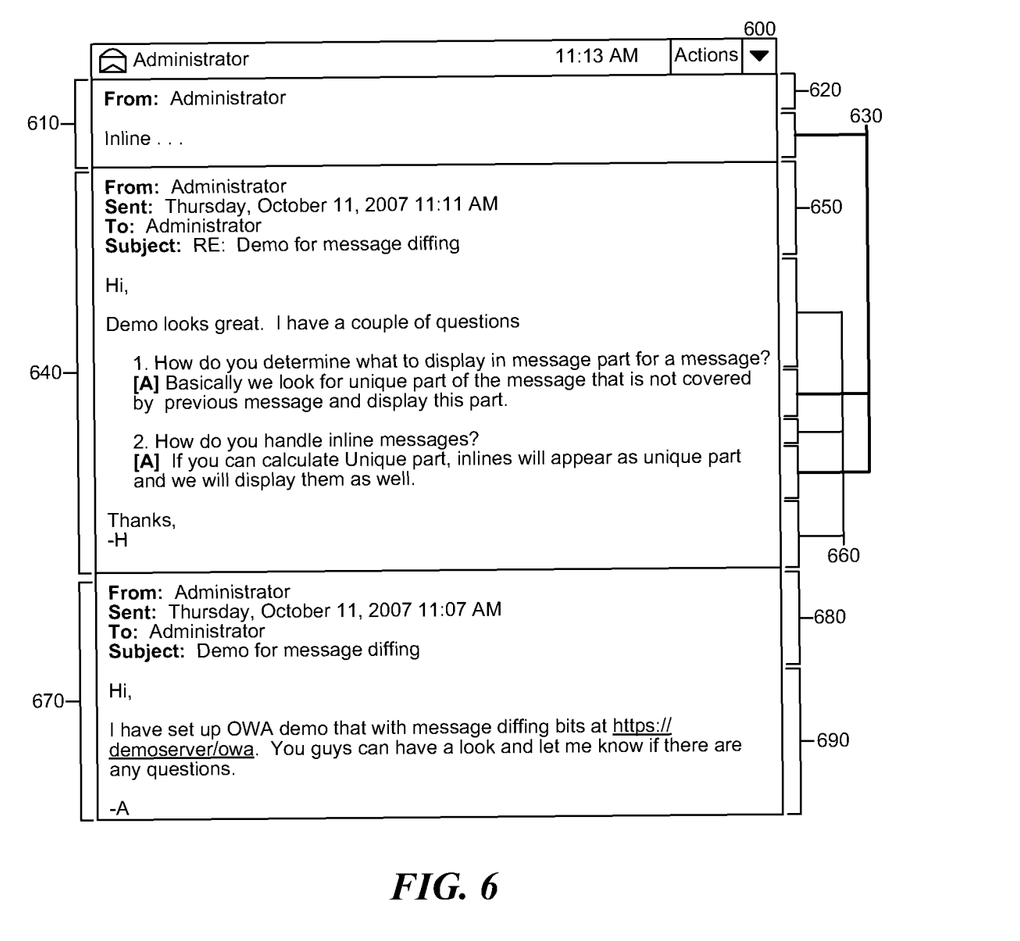
FIG. 6 is a display diagram that illustrates a display page of a conversation with inline replies received by the message extraction system, in one embodiment.

FIG. 6 is a display diagram that illustrates a display page of a conversation with inline replies received by the message extraction system, in one embodiment. The inline replies are in response to the message of FIG. 3. The message 600 contains a first reply portion 610, a second reply portion 640, and an original message portion 670. The first reply portion 610 contains a message header 620 and a message body 630 that is dispersed throughout the message 600, and in particular, part of which is inline to the second reply portion 640. The message header 620 displays the recipient of the message and the message body 630 displays the most recent reply text in the conversation. The second reply portion 640 contains a reply header 650 and a second reply message body 660. The second reply message body 660 is split up by the inline reply text of the latest reply. The original message portion 670 contains a reply header 680 and an original message body 690. The reply header 680 is generated by the conversation participant's email client when the participant replies to a message. The reply header 680 specifies details of the original message, such as who the message is from, when it was sent, any subject the message specified, and so on. The reply headers 640 and 680 have a common format that can be used to identify the beginning of the previous message bodies 660 and 690. Note that having the latest message 600, the message extraction system has all of the text of the two previous messages available, and using the techniques described here, the system may be able to reconstruct either one or both of the previous messages.

From the foregoing, it will be appreciated that specific embodiments of the message extraction system have been described herein for purposes of illustration, but that various modifications may be made without deviating from the spirit and scope of the invention. For example, although email messages have been used in examples, the message extraction system can be used equally well with any types of message or electronic conversations, such as forms, public folders, and so forth. Accordingly, the invention is not limited except as by the appended claims.

We claim:

1. A computer-implemented method for reconstructing a previous message in a conversation from a current message, the method comprising:

receiving at a client the current message from a server and a request from a conversation participant to open a previous message in the conversation, wherein the previous message contains a body and wherein the current message may contain the previous message body;

identifying at the client a previous message candidate within the current message that may contain the body of the previous message;

determining at the client a checksum of the previous message candidate;

comparing at the client the determined checksum of the previous message candidate with a checksum of the previous message, wherein the checksum of the previous message is obtained by the client by sending to the server a request for one or more previous message checksums separate from a request to retrieve a message and without downloading the entire previous message from the server to reduce at least some requests to download messages from the server, wherein the determined checksum comprises a message text checksum and a message format checksum, and wherein comparing includes receiving configuration information that indicates whether the format of the previous message candidate needs to match that of the previous message to determine that the messages are the same, and when the configuration information indicates that the format does not need to match, determining a match by comparing the message text checksum of the previous message candidate and the previous message and not comparing the format checksum; and when the checksums match, providing at the client an indication that the previous message candidate includes the body of the previous message.

2. The method of claim 1 further comprising, when the checksums match, reconstructing the previous message from the previous message candidate.

3. The method of claim 1 further comprising, when the checksums do not match, identifying a second previous message candidate, determining a checksum of the second previous message candidate, and comparing the determined checksum with the checksum of the previous message.

4. The method of claim 1 further comprising determining a count of words of the previous message candidate, comparing the count of words with a count of words of the previous message, and when the count of words match comparing the checksums.

5. The method of claim 1 wherein identifying a previous message candidate comprises locating a reply header in the body of the current message.

6. The method of claim 1 wherein identifying a previous message candidate comprises locating a change in formatting in the body of the current message.

7. The method of claim 1 wherein identifying a previous message candidate comprises location the end of the previous message candidate based on a count of words of the previous message.

8. The method of claim 1 wherein determining a checksum of the previous message candidate comprises invoking an algorithm selected from the group consisting of CRC32, SHA1, and MD5.

9. The method of claim 1 wherein the request from a conversation participant to open a previous message in the conversation comprises a request to open a message earlier than the latest previous message.

10. The method of claim 1 wherein the checksum of the previous message is obtained by requesting a list of previous message checksums without accessing the previous message text.

11. A computer system for efficiently delivering messages to a client by extracting previous messages from a currently opened message, the system comprising:
a processor and memory configured to execute software instructions embodied by the following components;
a message store component configured to store one or more messages and properties associated with the one or more messages;
a message integrity tag creation component configured to create a message integrity tag comprising a summary of the contents of a previous message;
a previous message identification component configured to identify previous message candidates within a current message that may contain the same body as a previous message;
a message integrity tag comparison component configured to compare a message integrity tag of a previous message with a message integrity tag of a previous message candidate to determine whether the body of the previous message candidate is the same as the body of the previous message, wherein the message integrity tag of the previous message can be obtained by a client computer system by sending to a server computer system a request for one or more previous message integrity tags separate from a request to retrieve a message and without downloading the entire previous message from the server computer system to reduce at least some requests to download messages from the server computer system, wherein the message integrity tag creation component creates a message integrity tag that contains a message text checksum and message format checksum, and wherein the message integrity tag comparison component is further configured to receive requests that indicate whether the format of the previous message candidate needs to match that of the previous message to determine that the messages are the same, and when a request indicates that the format does not need to match, determining a match by comparing the message text checksum of the previous message candidate and the previous message and not comparing the format checksum; and
a message reconstruction component configured to reconstruct a previous message from a current message that contains a previous message candidate that matches the previous message.

12. The system of claim 11 further comprising a message composition component configured to receive composed messages from conversation participants and invoke the message integrity tag creation component to create a message integrity tag for newly composed messages.

13. The system of claim 11 wherein the computer system operates in conjunction with Microsoft Exchange Server and the message integrity tag is stored as a MAPI property.

14. A tangible computer-readable storage device encoded with instructions for controlling a computer system to associate a message integrity tag with a message, by a method comprising:
receiving at the computer system a request to send a message, the message having a message body containing text and one or more identified recipients;
creating at the computer system a message integrity tag that comprises a checksum of the message body text;
storing at the computer system the message integrity tag as a property associated with the message, wherein the message integrity tag is stored in a way that the message integrity tag can be accessed by a client computer system without retrieving the message body text from a server computer system to reduce at least some requests to download message body text from the server computer system, wherein the message integrity tag comprises a message text checksum and a message format checksum, and wherein the message integrity tag indicates whether the format of a previous message candidate needs to match that of the message to determine that the messages are the same, and when the message integrity tag indicates that the format does not need to match, determining a match by comparing the message text checksum of the previous message candidate and the message and not comparing the format checksum; and
sending from the computer system the message to the identified recipients.

15. The computer-readable storage device of claim 14 wherein creating the message integrity tag comprises determining a number of words in the message body text and storing the number of words in the message integrity tag.

16. The computer-readable storage device of claim 14 wherein creating the message integrity tag further comprises a message format checksum that contains a checksum of at least some of the formatting information of the message body text.

17. The computer-readable storage device of claim 14 wherein creating the message integrity tag comprises masking some characters out of the message body text before determining the checksum of the message body text.

18. The computer-readable storage device of claim 14 further comprising, receiving a request to provide the message integrity tag associated with the message, and sending a reply containing the message integrity tag.

\* \* \* \* \*